Jan. 21, 1958   N. O. REGAN   2,820,640
MASTER COLLET WITH REPLACEABLE SOFT JAWS
Filed Aug. 5, 1955
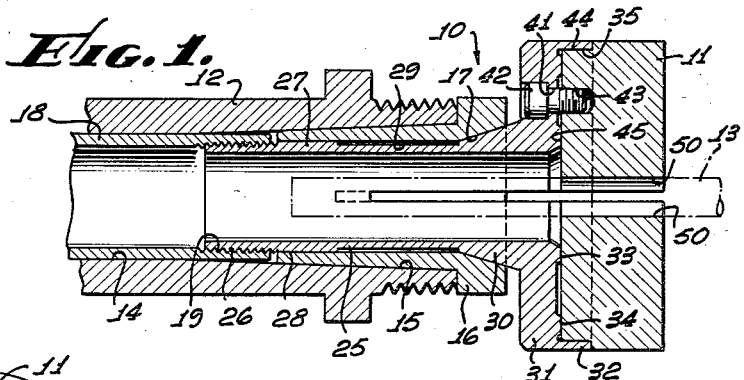
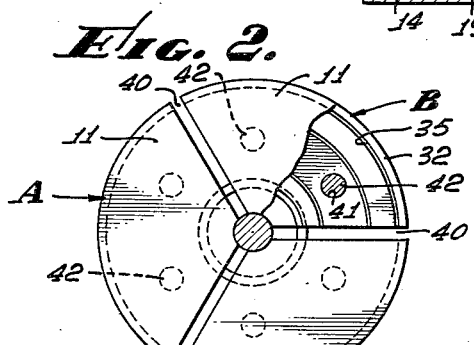
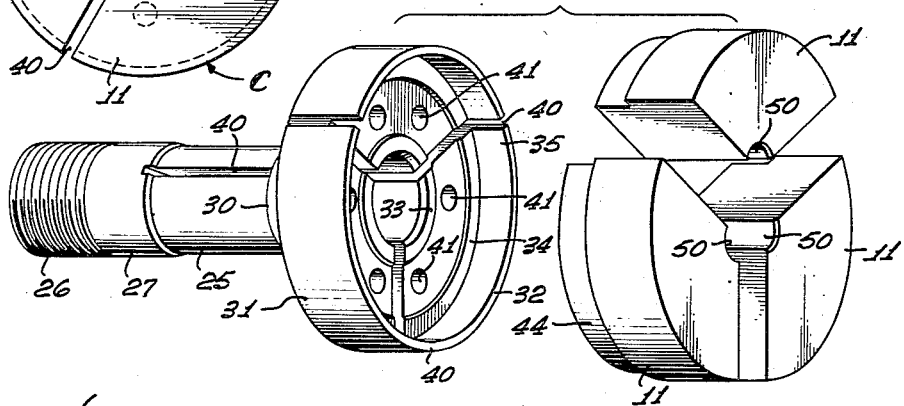
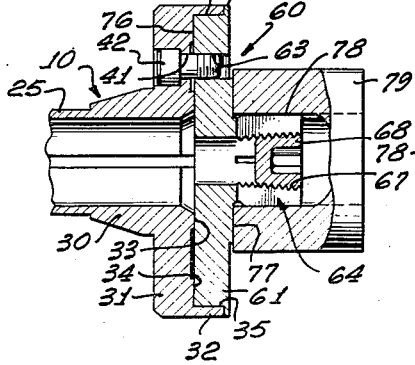
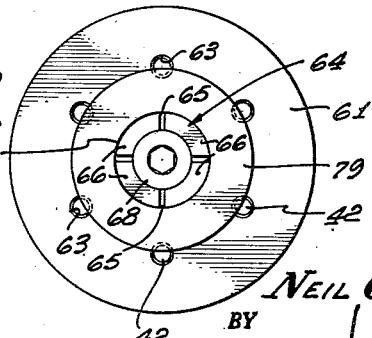
INVENTOR.
NEIL O. REGAN
BY
ATTORNEY.

United States Patent Office 2,820,640
Patented Jan. 21, 1958

2,820,640

MASTER COLLET WITH REPLACEABLE SOFT JAWS

Neil O. Regan, Glendale, Calif.

Application August 5, 1955, Serial No. 526,689

6 Claims. (Cl. 279—41)

This invention relates to devices for chucking work in lathes and is particularly useful in the smaller lathes. By far the greater portion of smaller lathes are installed in shops which do not have one of the larger lathes and the shop is thus limited to handling work of relatively small diameter for which the small lathe installed there is built to handle.

It is an object of the present invention to provide a relatively inexpensive means which can be added to a small lathe and which will enable this lathe to handle work of substantially larger diameter than it is capable of handling as built.

It is common practice for lathes to use slit collets for chucking work to be handled by the lathe. These collets have contractible jaws in which the work is gripped when the collet is pulled into the lathe spindle by the axially shiftable collet actuating tube provided within the lathe spindle. The distance which the jaws of the collet may be constricted in this manner is relatively small and therefore the opening between the jaws must be bored to fit the portion of the work which extends between the jaws. Such a close fit is also preferable in order to center the work with a high degree of accuracy before the machining operation thereon is started.

Heretofore it has been the practice to machine the collet to fit the work which means that the collet is thereafter adapted to fit only work of that particular diameter. The collet may, of course, be further enlarged in its internal diameter to fit larger work up to the point where the metal remaining in the periphery of the collet is insufficient to form chucking jaws for the work. The entire collet must then be thrown away. The cost of these collets is considerable, the price of a medium sized collet running over $13.00. When the entire collet must be discarded, of course, it has to be replaced by an entirely new collet.

It is another object of the present invention to provide a collet, the gripping jaws of which are separate from the main body of the collet, so that the cost of replacing these jaws is relatively small whereby it is never necessary to throw away the main body of the collet and the only portion of the collet which is used up are the gripping jaws thereof.

For the purpose of accuracy and long life it is necessary that the body of the collet be made of a very high grade of tool steel and that this be hardened so as to satisfactorily perform its functions of a precision work chuck. Steel of this quality thus hardened is difficult to machine and a problem existed in the prior manufacture of collets in making the main body of the collet hard and yet annealing the gripping jaws so that they might be machined without difficulty in adapting these jaws to a given piece of work.

It is yet a further object of the invention to provide a master collet with replaceable jaws in which the main body of the collet may be uniformly hardened to a high degree of hardness while the jaws are made of relatively soft metal thereby rendering them not only capable of ready machining for adapting them to fit a given piece of work but also substantially reducing the cost of these jaws.

It is also a common practice to mount an expansive mandrel in a lathe spindle for the purpose of expansively centering work to be machined on said lathe. These mandrels are likewise machined to fit the bore of a particular piece of work to be so centered and after once being so machined are unfit to use again on work having a larger bore. Thus, these mandrels come to have relative limited usefulness and it is eventually necessary to discard the entire mandrel.

It is a still further object of the present invention to provide a combination master collet with replaceable jaws and with a replaceable mandrel jaw unit which are adapted to be optionally associated with the master collet for functioning as a mandrel and which greatly reduces the cost of replacing the mandrel by necessitating merely replacement of the jaw unit itself.

The manner of accomplishing the foregoing objects as well as further objects and advantages will be made manifest in the following description taken in connection with the drawings in which:

Fig. 1 is a longitudinal sectional view taken through a preferred embodiment of the invention with the latter mounted on a lathe spindle.

Fig. 2 is a front elevational view of Fig. 1 with a portion of one jaw of the invention broken away to show the construction of the outer face of the flange of the invention.

Fig. 3 is an exploded perspective view of the master collet of the invention with the replaceable soft jaws of the invention removed from the master collet and shifted apart to illustrate the details of the structure of these.

Fig. 4 is a longitudinal sectional view of a portion of the master collet of the invention with the latter having an expansive jaw unit mounted thereon to permit said master collet to be employed as an expansive mandrel.

Fig. 5 is an end elevational view of Fig. 4.

Referring specifically to the drawings, and particularly to Fig. 1 the invention is here shown as embodied in a master collet 10 having replaceable soft jaws 11 and mounted in a lathe spindle 12 for permitting operation on a piece of work 13.

The lathe spindle 12 has a bore 14, the outer end portion 15 of which is tapered and which is shown in Fig. 1 as equipped with an adapter sleeve 16 which provides the mouth of spindle 12 with a still steeper but shorter taper 17. Shiftable axially in the bore 14 of the spindle 12 is a collet actuating tube 18 having internal threads 19 which are adapted to be used for connecting with the master collet 10.

The master collet 10 includes a thin tubular sleeve 25 which is provided at its inner end with threads 26 which match and are adapted to be screwed into the threads 19 of the actuating tube 18. The sleeve 25 has an outwardly thickened section 27, the outer face 28 of which is ground to make a precise sliding fit with the bore 29 of the adapter sleeve 16. The other end of the sleeve 25 joins through a relatively heavy tapered shoulder 30 with a relatively heavy radial flange 31 having a peripheral cylindrical lip 32. The flange 31 has inner and outer ground concentric radial surfaces 33 and 34 and the lip 32 has a ground internal cylindrical surface 35. The lip 32, flange 31, shoulder 30 and a substantial portion of the sleeve 25 are divided by three slots 40 to separate these portions of the master collet 10 into like segments A, B, and C. Each of the segments A, B, and C are provided with a pair of cap screw holes 41 for receiving cap screws 42 which screw into threaded holes 43 provided in the soft jaws 11 for uniting the latter with the master collet 10.

The jaws 11 of the master collet 10 comprises approximately 120° segments of a true cylinder with an outside diameter equal to the outside diameter of the collet lip 32 and the jaws 11 are provided with a concentric recess 44 for receiving the lip 32 when the jaws are assembled on the master collet 10. The cylindrical surface of the recess 44 is ground to make it fit the ground surface 35. The inner end faces 45 of the jaws 11 are also ground to engage the ground surfaces 33 and 34 of the master collet when the jaws 11 are properly mounted on said collet.

The apices of the collet jaws 11 are provided with concave cylindrical surfaces 50 which are concentric with the axis of the master collet 10 when the jaws are properly mounted on the collet segments A, B, and C. The surfaces 50 when thus concentrically related conform to a cylindrical surface of, for instance, three-eighths of an inch in diameter. Assuming that this is the case with the master collet shown in the drawings and above described, the jaws 11 are mounted on the master collet 10 and employed in a machining operation in the following manner:

Operation

The jaws 11 are inserted in the respective segments A, B and C of the master collet 10 and screws 42 are inserted through the holes 41 in the collet and screwed into the tapped holes 43 in the jaws so as to loosely secure the jaws to the collet.

The solid end of a $25/64$ drill is now inserted in the center of the jaws, this drill being sufficiently larger than the size of the hole produced by the concave surfaces 50 to snugly expand the jaws 11 into close conformity with the lip 32 of the master collet 10. The screws 42 are now tightened to rigidly unite the jaws with the collet.

To prepare the collet for use in chucking work of a certain diameter, the collet is inserted into the spindle and screwed into the threads 19 provided on the actuating tube 18 of the lathe. A small piece of soft bar stock of three-eighths inch diameter is now inserted in the central hole between the jaws 11 and the collet is tightened down on said bar to grip this with a normal collet pressure by drawing the actuating tube 18 inwardly in the spindle 12. It is assumed, of course, that the work to be handled by the collet 11 has a diameter in excess of three-eighths of an inch. The spindle and collet are now rotated by the lathe. A bore to fit the work to be handled by the collet is machined in the jaws 11, this operation, of course, machining away a part of the soft stock which is gripped between the jaws 11 and holds these in concentric relation with each other and with the axis of the spindle 12 while the boring is being done.

It is also assumed that, in this operation, it is not desired to form the bore in question, so as to extend it axially entirely through the jaws 11. In case a bore of this length is required, the concentric relation of the jaws 11, while they are being bored, is attained by inserting a piece of cylindrical stock in the master collet 10 right behind the jaws 11 which stock is of a proper diameter to cause the segments A, B and C of the collet to be in concentric relation when the segments are constricted on said piece of stock. In the embodiment disclosed, such a piece of stock would be of precisely the same outside diameter as the inside diameter of the collet sleeve 25. In a master collet 10 as presently being manufactured, this diameter is $15/16$ of an inch. With the collet closed on an inserted piece of stock of this diameter, a bore may be extended axially entirely through the jaws 11.

The bore made in the jaws 11 for adapting this to work of a certain diameter usually extends only to a depth so that this does not extend through the radial plane of the outer edge of the collet lip 32. Thus this bore may be of a diameter closely approaching the outside diameter of the collet flange 31 and still leaves sufficient material in the jaws 11 to accurately center and securely grip the work which the collet is prepared to handle.

By the use of the master collet 10 and soft replaceable jaws 11 a small lathe is enabled to handle work of considerably larger diameter than the lathe is originally made for chucking. The range of sizes of material which can be handled by a small lathe is thus increased thereby expanding the capacity and usefulness of such lathes.

The present invention also has the great merit of enabling the main body of the collet to be made of high grade steel and uniformly hardened so as to give a high degree of chucking accuracy to the collet while at the same time providing jaws on the collet which are relatively soft and may be easily machined to provide the necessary bore for each particular diameter of work to be handled by the collet. Being of relatively soft metal the material cost as well as the cost of manufacture of these jaws is low. The jaws may therefore be sold at a low price and replaced for each new job without the necessity of replacing the main body of the collet. The collet may thus be used indefinitely and a high degree of precision attained therewith while a separate set of jaws can be filed away for each job so as to always be ready for repeat orders and this can be done at a relatively low cost.

The individual segments A, B and C of the master collet 10 may if desired be numbered and the individual jaws 11 used on any job be stamped with the job number and also with the respective numbers of the collet segments on which said jaws were originally assembled. Thus in reassembling any set of jaws 11 on the master collet 10 an identity in the relationship between the jaws and the collet will be maintained.

The present invention also provides a means for employing the master collet 10 as the mount for an expanding mandrel 60, the structure of a preferred embodiment of which is illustrated in Figs. 4 and 5. The mandrel 60 includes a flat circular plate 61 which snugly fits within the collet lip 32 and against the ground surfaces 33 and 34 of the collet, the plate 61 having a peripheral bead 62 which bears against the end of the lip 32. Tapped holes 63 are provided in the plate 61 to match the holes 41 in the collet so that the screws 42 may be extended through the holes 41 and screwed into the holes 63 to securely mount the mandrel 60 on the master collet 10.

The mandrel 60 has a hollow cylindrical work support 64 extending axially therefrom, this support being divided by kerfs 65 into four segments 66 and being internally threaded with tapered pipe threads 67 to permit the same to receive a tapered plug 68. The peripheral cylindrical surface 75 of the plate 61 is ground to precisely fit the ground surface 35 of the master collet 10. The radial face 76 of the plate 61 is preferably ground to precisely fit the ground surfaces 33 and 34 of the master collet 10. The front face of the plate 61 is provided with an annular ground surface 77 which is in a true radial plane relative to the axis of the mandrel 60.

In order to use the expansive mandrel 60 it is first inserted in the master collet 10 and secured thereto by the screws 42 as shown in Figs. 4 and 5. The master collet is then loaded into the machine and axial tension applied thereto by the actuating tube 18 to rigidly center the collet on the spindle 12. The cylindrical work support 64 is provided with an external cylindrical surface 78 which is in excess of the inside diameter of the types of work which this mandrel is intended to be used with. It is therefore generally necessary before using the mandrel to turn down the face 78 to where this face has an outside diameter which will slide readily into the bore of the work to be supported thereon.

The mounting of a piece of work such as the collar 79 shown in Figs. 4 and 5 on the mandrel 60 is effected by slipping this collar over the work support 64 and back against the ground face 77 on the mandrel plate 61, inserting a wrench into the plug 68, and tightening this plug in the threads 67 thereby expanding segments 66 of the work support into snug contact with the bore of the collar 79 while the latter is in snug engagement with the ground face 77.

The work 79 is now supported on the mandrel 60 in readiness for whatever machining operation is to be performed thereon.

The mandrel 60 is also made of relatively soft metal and its material cost and the cost of machining it are therefore comparatively low. Such a mandrel with its work engaging face 78 of a proper diameter for each job may therefore be prepared and filed for repeat orders of that job at relatively low cost per job. It is also to be noted that with the single master collet 10 any number of sets of jaws 11 and expansive mandrels 60 may be employed and it will never be necessary to discard the master collet 10 but the latter may always be employed in connection with the particular group of jaws 11 or the particular expanding mandrel 60 which has been prepared for any particular job of machine work.

The claims are:

1. In a collet adapted for use with a lathe spindle having a bore with a tapered mouth, the combination of: a unitary collet body including a tubular sleeve terminating at its outer end in a heavy radial flange, a heavy tapered shoulder uniting said sleeve with said flange and being tapered to fit said mouth, said body having three equally spaced slots dividing said flange, said shoulder and a substantial portion of said sleeve into three equal segments; three work gripping jaws in the form of segments of a cylinder of approximately 120° each; and means for temporarily fastening said jaws to outer faces of the respective segments of said flange.

2. A combination as in claim 1 in which said flange is provided with a peripheral cylindrical lip extending in the opposite direction than said sleeve lies from said flange, a pair of concentric radial ground faces being provided on the face of said flange within said lip, said jaw fastening means comprising screws which extend through said flange and into said jaws to hold the latter rigidly against said ground faces with said jaws fitting snugly within said lip.

3. A combination as in claim 2 in which said lip has a ground inner face and said jaws have ground peripheral faces which fit said lip face when said jaws are concentrically related to said master collet.

4. A combination as in claim 3 in which said jaw segments are provided at their apices with cylindrical concave surfaces which surfaces are concentric with said master collet when said jaws are properly related thereto, said concave surfaces being adapted to receive a slightly oversized cylindrical member to hold said jaws radially apart and with their peripheral ground surfaces in snug engagement with said lip ground surface while said jaws are being secured by said screws to the master collet.

5. A combination as in claim 4 in which said jaws when assembled in said master collet have a diameter at least as great as that of said master collet, said peripheral ground surfaces of said jaws being formed in a peripheral recess adapted to neatly receive said lip when said jaws are assembled on said master collet.

6. In a collet adapted for use with a lathe spindle having a bore with a tapered mouth, the combination of: a unitary collet body including a tubular sleeve terminating at its outer end in a heavy radial flange, a heavy tapered shoulder uniting said sleeve with said flange, said body having three equally spaced slots dividing said flange, said shoulder and a substantial portion of said sleeve into three equal segments, said flange having a peripheral cylindrical lip formed concentrically with said body to extend beyond the outer face of said flange, said lip also being divided by said three slots, there being a pair of concentric ground surfaces which are raised axially above said outer face of said flange and a ground cylindrical face formed internally on said lip to be concentric with said body, there also being screw holes formed in the respective segments of said flange in parallelism with the axis of said body, said screw holes lying between said ground surfaces formed on said flange; three work gripping jaws formed of soft metal and comprising substantially segments of a cylinder of approximately 120° each, each of said jaws being adapted to fit within said lip of one of said flange segments against the ground faces thereof and having tapped screw holes which are then aligned with the corresponding screw holes of said flange segment; and screws which extend through the holes in said flange segments into the tapped holes in said jaw segments to hold said jaw segments precisely related with their corresponding flange segments and in snug engagement with the ground faces of said flange segments.

References Cited in the file of this patent

UNITED STATES PATENTS

| 978,055 | Owens | Dec. 6, 1910 |
| 1,411,082 | Gotsdanker | Mar. 28, 1922 |
| 1,463,176 | Schieldge | July 31, 1923 |

FOREIGN PATENTS

| 482,101 | Canada | Apr. 1, 1952 |